United States Patent [19]

Moody

[11] Patent Number: 5,076,114

[45] Date of Patent: Dec. 31, 1991

[54] ELECTROMAGNETIC INTERLOCK

[75] Inventor: John W. Moody, Clarkston, Mich.

[73] Assignee: Pontiac Coil Inc., Pontiac Plans, Mich.

[21] Appl. No.: 523,080

[22] Filed: May 14, 1990

[51] Int. Cl.$^5$ ............................ F16C 1/10; H01F 7/20
[52] U.S. Cl. ............................ 74/501.5 R; 192/4 A; 335/285; 335/286; 74/502
[58] Field of Search ............... 74/501.5 R, 501.6, 502, 74/502.4, 502.6; 335/285, 286, 289, 293, 255; 192/4 A

[56]  References Cited

U.S. PATENT DOCUMENTS

| | | | |
|---|---|---|---|
| 1,635,144 | 7/1927 | Stevens | 335/289 |
| 2,275,839 | 3/1942 | Boehne | 335/286 X |
| 2,437,406 | 3/1948 | Rogers | 335/255 X |
| 3,488,611 | 1/1970 | Harper | 335/255 X |
| 3,533,652 | 10/1970 | Crane et al. | 335/289 X |
| 3,629,747 | 12/1971 | Findley | 335/255 X |
| 4,813,729 | 3/1989 | Speckhart | 335/285 X |
| 4,871,989 | 10/1989 | Gross | 335/255 X |
| 4,887,702 | 12/1989 | Ratke et al. | 192/4 A |

FOREIGN PATENT DOCUMENTS

| | | | |
|---|---|---|---|
| 0274304 | 12/1986 | Japan | 335/255 |
| 0278311 | 11/1988 | Japan | 335/255 |
| 1418606 | 12/1975 | United Kingdom | 335/255 |

Primary Examiner—Vinh T. Luong
Attorney, Agent, or Firm—Krass & Young

[57] ABSTRACT

A holding device for immobilizing a cable includes a generally cylindrical electromagnet with a central passageway extending therethrough and a holding assembly comprised of a ferromagnetic body joined to a tubular stem. The ferromagnetic body and stem have a passageway therethrough and are disposed so that the stem passes through the central passageway of the electromagnet. A cable which passes through the passageway of the stem and affixed thereto is immobilized when the electromagnet is activated.

14 Claims, 2 Drawing Sheets

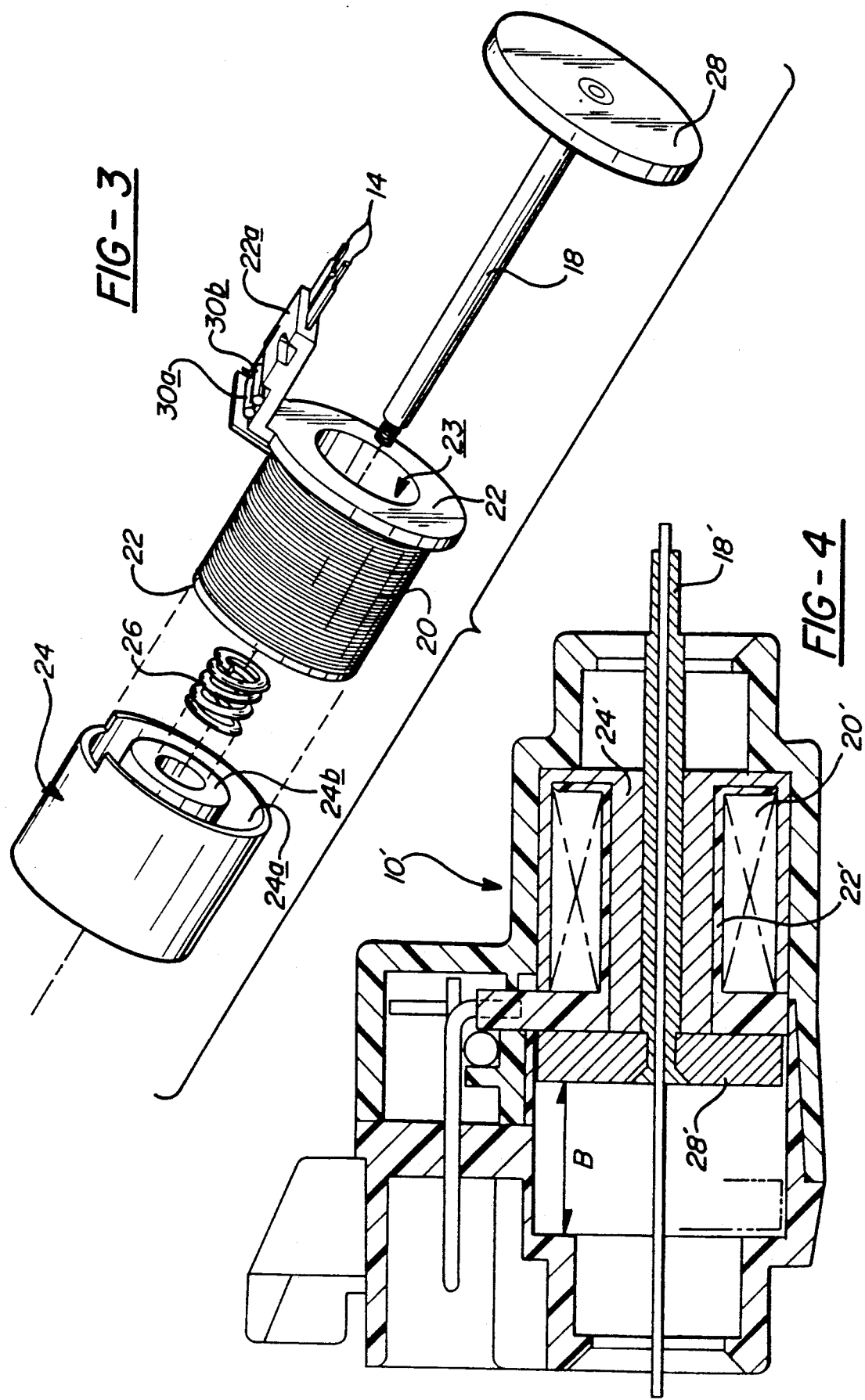

ELECTROMAGNETIC INTERLOCK

FIELD OF THE INVENTION

This invention relates generally to electromagnets. More specifically, the invention relates to electromagnetic holding devices for immobilizing a cable.

BACKGROUND OF THE INVENTION

A great variety of mechanical systems are controlled by cables, push rods or other such elongated force-transmitting members. Control systems of this type are very widely employed in many vehicular applications and also in many industrial applications, such a machine tools, manufacturing equipment and materials handling systems. For reasons of safety and/or process control, it is often desirable to lock out or otherwise immobilize such control systems. One example typical of such applications is the brake transmission safety interlock (BTSI) system utilized in automobiles. A system of this type operates to prevent a vehicle's transmission from being taken out of the "park" position if the braking system is not activated. The object of employing a BTSI system is to prevent run away acceleration of the vehicle when the gears are shifted. In a typical BTSI system, the shift linkage has a cable-activated locking latch associated therewith. This latch must be released, typically by activating a button associated with the shifter and communicating with the latch by a cable or push rod, before the transmission may be shifted out of the "park" position. BTSI systems further include some type of immobilizing device associated with the cable and communicating with the brake system. The immobilizing device prevents movement of the cable and hence, release of the latch if the brake system is not activated.

One typical prior art cable immobilizing system is shown in U.S. Pat. No. 4,887,702 which describes a typical latch mechanism as well as a particular solenoid-controlled BTSI system. In this system, the latch release cable is associated with the plunger of a solenoid and activation of the solenoid draws the plunger and cable into the solenoid coil thereby preventing further motion of the cable. In its unactivated state, the plunger, and hence the cable, is free to move back and forth.

It has been found, in accord with the present invention, that a solenoid is not the optimum device for this type of application. In general, solenoids are operative to provide motion whereas the object of a BTSI system is to immobilize the latch release cable and such immobilization is more advantageously carried out by means of an electromagnet. A solenoid generally has lower holding power than an electromagnet of comparable size and weight. Consequently, solenoid-based cable immobilization systems are larger and consume more raw materials and more power in operation than do electromagnet based systems.

Prior art cable immobilization systems have the further disadvantage of requiring assembly of the immobilizing device around and on to the cable. This unduly complicates the incorporation of such devices into vehicles or other complex articles of manufacture. It would clearly be desirable to have a cable immobilizing device which can be provided in a finished form and simply retrofitted or otherwise attached to a cable without the necessity for any disassembly of the cable assembly or the holding device.

The present invention overcomes the problems of the prior art by providing an electromagnet-based cable immobilizing device which is smaller in size and has higher holding power than previously employed apparatus. Furthermore, the holding device of the present invention may be completely manufactured in advance and subsequently fitted onto a cable. The small size, high power and simple installation of the present cable immobilizing device readily adapt it to a variety of applications, both in vehicles and in connection with a number of other systems. These and other advantages of the present invention will be readily apparent from the drawings, discussion and description which follow.

BRIEF DESCRIPTION OF THE INVENTION

Disclosed herein is an electromagnetic holding device for immobilizing a cable. The device comprises a generally cylindrical electromagnet having a central passage therethrough and further comprises holding assembly which consists of (1) a ferromagnetic body having an aperture therethrough and (2) an elongated, tubular stem fabricated from a non-magnetic material and including a passage extending lengthwise therethrough and configured to receive and retain the cable. The stem is disposed in a perpendicular relationship with the ferromagnetic body so that its passageway is in communication with the aperture in the ferromagnetic body. The holding device further includes a housing configured to receive and retain the electromagnet and the holding assembly in an aligned relationship such that a portion of the stem of the assembly projects into the central passage of the electromagnet. When the cable is received and retained by the tubular member, activation of the electromagnet will retain the ferromagnetic body and thereby immobilize the cable.

In a particular embodiment, the electromagnet is comprised of a coil encased in a generally cylindrical canister having an exterior wall and a coaxially aligned interior wall defining an annular space therebetween for receiving and retaining the coil. In still further embodiments, the coil has a pair of electrical terminals communicating therewith and the terminals may include a pair of diodes, a first diode in series with the coil and a second in parallel therewith.

The housing may be configured in a generally cylindrical form and include a pair of openings at opposite ends thereof in axial alignment with the aperture and passageway so as to permit the cable to be passed therethrough.

BRIEF DESCRIPTION OF THE DRAWINGS

FIG. 3 is an exploded, perspective view of the holding assembly, coil canister and spring of the FIG. 2 embodiment; and FIG. 4 is a cross-sectional view of yet another configuration of holding device structured in accord with the principles of the present invention.

DETAILED DESCRIPTION OF THE INVENTION

Figure 1:
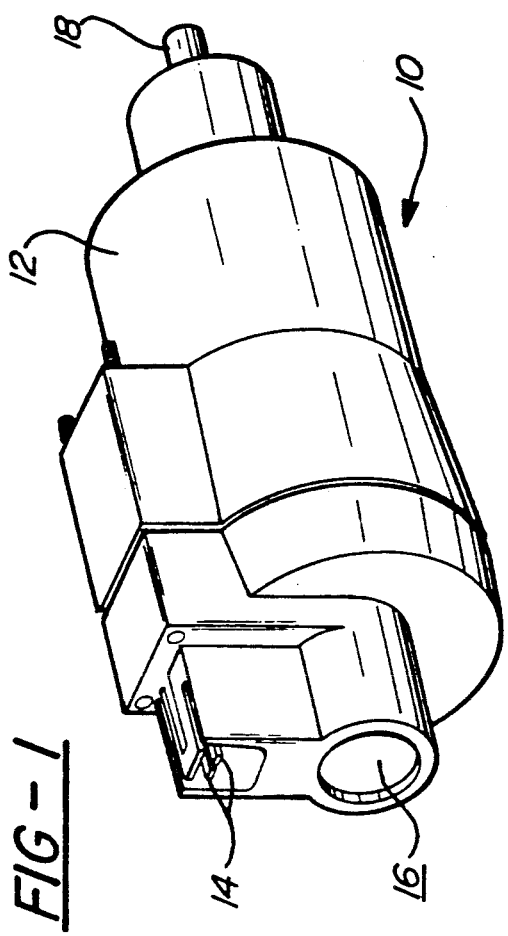
FIG. 1 is a perspective view of one embodiment of cable holding device structured in accord with the principles of the invention.

Referring now to FIG. 1, there is shown a perspective view of one embodiment of electromagnetic holding device 10 structured in accord with the principles of the present invention and operative to immobilize a cable. The holding device 10 of FIG. 1 includes a housing 12, supporting and enclosing a pair of terminals 14 at one end thereof and defining an opening 16 on a first end thereof. Visible at the second end is a portion of the stem 18 of the holding assembly which projects through a second opening (not shown). The particular holding device shown in FIG. 1 is adapted for use in a BTSI system, although it is to be understood that this particular device, as well as the other embodiments of this invention may be employed in a variety of applications wherein immobilization of a cable, rod, chain or other elongated member is desired.

Figure 2:
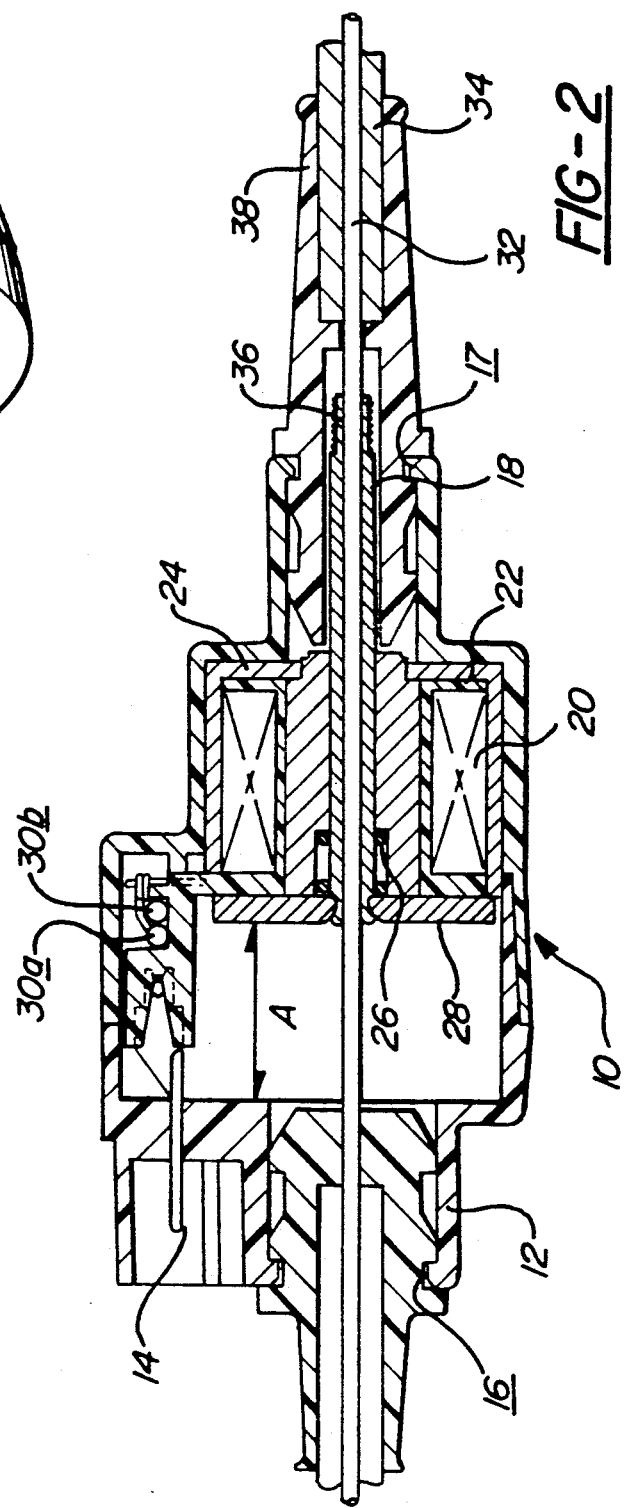
FIG. 2 is a cross-sectional view of the cable-holding device of FIG. 1.

Referring now to FIG. 2, there is shown a cross-sectional view of an electromagnetic holding device generally similar to that of FIG. 1 as further incorporated into a system for locking a cable. The holding device 10 includes an electromagnet which is comprised of a coil of wire 20, which in this embodiment is wound about a support spool 22 and is disposed within a canister 24. It will be noted that the coil 20 and canister 24 are configured so as to provide a central passage through the electromagnet assembly. The electromagnet assembly will be described in greater detail with reference to FIG. 3 hereinbelow.

The holding device 10 further includes an holding assembly which is comprised of a ferromagnetic body 28, which in this instance is a generally planar disk. The ferromagnetic body includes an aperture extending therethrough. The holding assembly further comprises a generally elongated, tubular stem member 18 which has a central passage extending the length thereof. The stem member is fabricated from a non-magnetic material and is joined to the ferromagnetic member 28 in an approximately perpendicular orientation, with the relationship between the two members of the holding assembly being such that the aperture of the ferromagnetic body is generally aligned with the passage through the tubular member 18.

The electromagnet and the holding assembly are disposed such that at least a portion of the tubular member 18 extends through, and is translatable along the length of the central passage of the electromagnet.

As noted hereinabove, the electromagnet and holding assembly are disposed within a housing 12 which functions to support these elements in a proper relationship. The housing 12 includes front 16 and rear 17 opening therethrough which are generally aligned with the central passage of the electromagnet. The housing may be fabricated from a variety of materials such as metals, polymers and the like. One particularly preferred group of materials is comprised of synthetic, organic, polymeric materials with a specific material being a nylon polymer such as a product sold under the trade designation "ST800" by the General Electric Corporation.

The holding device of the present invention includes a pair of electrical terminals 14 in electrical communication with the coil 20 and operative to provide for the energization thereof. In this embodiment, these terminals 14 are supported by, and project from the housing 12. It will be noted that the terminals in this embodiment are also supported internally by an extension formed from the spool 22.

It is generally preferred to include one or more diodes in the electrical circuit of the holding device so as to assure proper polarization of the device and to prevent the propagation of inductive noise or other transients through circuitry attached thereto. As is well known to those of skill in the art, various configurations of diodes may be employed to achieve polarity protection and/or switching and/or noise suppression. In the illustrated embodiment, a first one of the diodes $30a$ is electrically in series with a first one of the terminals 14 and the coil 20. A second diode $30b$ is electrically in parallel with the terminals 14 and the coil 20.

The illustration of FIG. 2, depicts the holding device 10 as operative to retain and immobilize a cable 32 therein. As illustrated, the cable 32 is disposed within a sheath 34 which is typically a flexible sheath having sufficient clearance to allow for motion of the cable. Such items are a staple item of commerce and are known and available to those of skill in the art. The cable 32 is partially freed of its sheath 34 and passes through the first opening 16 of the housing 12, through the aperture in the ferromagnetic body 28, through the passage in the stem 18 and hence through the central passageway of the electromagnet and exits from the second end 17 of the housing 12. It will be noted that the cable 32 is rigidly affixed to the end of the stem 18 distal the ferromagnetic body 28, by a crimp 36 formed thereupon. It will also be noted that the assembly as illustrated, includes a pair of elastomeric coupling members or shrouds 38 for joining the sheath 34 of the cable 32 to the housing 12.

In operation, activation of the electromagnet, by application of electrical current to the coil 20 via the terminals 14, creates a magnetic field which holds the ferromagnetic body 28 against the canister 24 thereby immobilizing the cable 32. Termination of the electrical signal releases the ferromagnetic body and the holding assembly and associated cable are free to move longitudinally through the housing for the distance A. In those instances where the holding device 10 is employed in a BTSI system, the cable 32 will be operatively connected to the shifter linkage of the automobile. When the cable 32 is immobilized, it will prevent the automobile from being removed from the "park" condition. As noted, in a BTSI application, the terminals 14 of the device 10 will be in electrical communication with the braking system of the vehicle so as to release the cable when the brakes are activated.

Referring now to FIG. 3, there is shown an exploded, perspective view of the holding assembly and electromagnet of the FIG. 2 embodiment. As illustrated, the holding assembly comprises a ferromagnetic body 28, herein configured as a disk, although it is to be understood that ferromagnetic bodies of other shapes may be similarly employed, provided they include a central aperture for passage of the cable therethrough. The holding assembly further includes a stem 18, which is fabricated from a non-magnetic material such as brass, stainless steel, copper, aluminum or synthetic polymeric materials. It is important that the stem 18 be non-magnetic so that it not interfere with the holding of the ferromagnetic body 28 by the electromagnet. This feature differentiates the present invention from solenoid-based systems in which a ferromagnetic body is disposed within a coil of conductive material.

The electromagnet portion of the holding device includes a coil 20 of electrically conductive wire, preferably copper wire. And in the illustrated embodiment, the coil 20 is wound about an electrically insulating spool 22 which is preferably manufactured from a synthetic organic polymer. And as is well known in the art, the exterior of the coil 20 may be wrapped with a layer of insulating material such as fabric, polymer or the like.

The spool 22 is further configured, in the illustrated embodiment, to include a support portion 22a which retains a pair of terminals and a pair of diodes 30a and 30b as hereinabove described. The electromagnet further includes a canister 24 disposed to contain the coil 20. The canister 24 is fabricated from a magnetic material such as steel and as shown, includes an outer, generally cylindrical wall 24a and a generally cylindrical inner wall 24b concentric and coaxial therewith. The outer wall 24a and inner wall 24b define an annular space therebetween which receives the coil 20. The inner wall 24b further defines the central passageway 23 of the electromagnet. As illustrated, the electromagnet also has a spring 26 associated therewith. When the electromagnet is assembled and the holding assembly disposed therein, the spring is retained by the stem 18 and serves to bias the ferromagnetic member 28 from the canister 24 so as to overcome any residual magnetism retaining the two upon deactivation of the coil 20.

Clearly, the holding device of the present invention may be manufactured utilizing various configurations of magnet coils, various sized canisters and various configurations of holding assembly. The choice of design will be dictated by the desired parameters of the finished device. In one particular embodiment useful as a BTSI component, the coil 20 is manufactured from approximately 1400 turns of 30 gage copper wire and has a resistance of approximately 45 ohms. The coil is approximately 1 inch in diameter, ¾ of an inch high and has a central aperture of approximately ½ inch. In this particular embodiment, the ferromagnetic body of the holding assembly is configured as a disk of steel having a diameter of approximately 1 ¼ inch and a thickness of approximately 3/32 inch. The stem is fabricated from a stainless steel tube approximately 1 ¾ inches long and ¼ inch diameter and includes a central passageway approximately 1/16 inch in diameter. The housing is configured to allow an overall path of travel of the cable of approximately 0.560 inches. This particular holding device has been found to exert a holding force of approximately 25 pounds when energized with approximately 12 volts of power at approximately 20° C. Furthermore, the holding device has been found to have a useful functional range of at least −40° C. to 92° C. and can withstand a reverse voltage of up to 16 volts for at least one minute without detrimental effect or any pass through of that voltage and can withstand an applied voltage of at least 24 volts for at least five minutes. The holding device is rugged and sustains no functional damage when dropped onto a hard surface from a distance of at least 1 meter. It is easy to install and readily matable with standard wiring harnesses and BTSI cable conduit.

The holding device of the present invention may be manufactured in configurations other than those hereinabove described. For example, FIG. 4 depicts a cross-sectional view of yet another embodiment of electromagnetic holding device 10' structured in accord with the principles of the present invention. This device 10' is generally similar to that illustrated hereinabove but is smaller in size. It includes an electromagnet having a coil 20' wound about a spool 22' and disposed within a canister 24'. This embodiment further includes a holding assembly having a stem 18' and a ferromagnetic body 28'. The illustrated embodiment has a stroke B of approximately 0.350 inch. Clearly, other such variations may be prepared in accord with the principles of the present invention.

While the foregoing description is primarily focused upon an electromagnetic holding device for use in BTSI systems, it is clearly to be understood that these devices may be employed in any instance wherein a cable, rod, cord or chain is to be immobilized against longitudinal travel. The holding devices of the present invention confer significant advantage in manufacture, operation and use because of their unique designs. Use of an electromagnetic holding device minimizes power consumption, size of the device, and expense associated with manufacture while providing for a high level of holding power. Use of the particular design incorporating a linear passage therethrough allows the device to be readily inserted onto a cable or rod and attached thereto without the necessity of disassembling the holding device. In view of the foregoing, it should be clear that numerous other variations and modifications of the herein described invention should be apparent to one of skill in the art. Accordingly, the foregoing drawings, discussion and description are merely meant to be illustrative of particular embodiments of the invention and are not meant to be a limitation upon the practice thereof. It is the following claims, including all equivalents, which define the scope of the invention.

I claim:

1. An electromagnetic holding device comprising:
   a cable;
   a generally cylindrical electromagnet having a central passage therethrough;
   a holding assembly comprising (1) a ferromagnetic body having a aperture therethrough and (2) an elongated, tubular stem fabricated from a non-magnetic material and including a passage extending lengthwise therethrough having said cable retained therein, said stem being disposed in a perpendicular relationship with the ferromagnetic body so that the passageway thereof is in communication with the aperture of the ferromagnetic body; and
   a housing configured to receive and retain the electromagnet and holding assembly in an aligned relationship such that a portion of the stem of the holding assembly projects into the central passage of the electromagnet, whereby said cable is immobilized upon activation of the electromagnet.

2. A holding device as in claim 1, wherein said electromagnet further includes:
   a generally cylindrical canister having an outer cylindrical wall and an inner cylindrical wall coaxially aligned so as to define an annular space therebetween, said magnet further including a coil of electrically conductive wire disposed within said annular space, the inner cylindrical wall further defining the central passage through the electromagnet.

3. A holding device as in claim 2, wherein said coil includes approximately 1,400 turns of 30 gage wire and has a resistance of approximately 45 ohms.

4. A holding device as in claim 1, further including a pair of electrical terminals in electrical communication with the electromagnet.

5. A holding device as in claim 4, further including a diode associated with at least one of said terminals.

6. A holding device as in claim 4, including a pair of diodes associated with said terminals, a first diode being disposed in a series relationship with a first one of said terminals and a second diode being disposed between said terminals and in a parallel relationship with the electromagnet.

7. A holding device as in claim 2, wherein said coil is wound about a non-magnetic spool.

8. A holding device as in claim 1, wherein the ferromagnetic body of said holding assembly is a disk-shaped member.

9. A holding device as in claim 1, wherein the stem is fabricated from a material selected from the group consisting essentially of: stainless steel, brass, copper, aluminum, synthetic polymers and combinations thereof.

10. A holding device as in claim 1, wherein said stem is of a length sufficient for the end thereof distal the ferromagnetic body, to extend outward from the housing.

11. A holding device as in claim 1, further including a coil spring disposed around the tubular stem and operable to bias the ferromagnetic body away from the electromagnet.

12. A holding device as in claim 1, wherein said housing is further configured in a generally cylindrical shape and includes a pair of axially aligned openings in either end thereof, said openings further aligned with the central passage of the electromagnet, the aperture in the ferromagnetic body and the passage in the stem.

13. A holding device as in claim 4, wherein said housing is further configured to support said terminals.

14. An electromagnetic holding device comprising:
I. a generally cylindrical electromagnet comprising:
a spool having a central passageway therethrough;
a coil of electrically conductive wire wound about the spool; and
a generally cylindrical canister fabricated from a ferromagnetic material, said canister including an outer cylindrical wall and an inner cylindrical wall coaxially aligned therewith so as to define an annular space therebetween configured to receive and retain said coil and spool;
II. a cable;
III. a holding assembly comprising:
a generally planar, disk-shaped ferromagnetic body having a central aperture passing therethrough; and
an elongated, tubular stem fabricated from a non-magnetic material and including a passage extending lengthwise therethrough having said cable retained therein, said stem being disposed in a perpendicular relationship with the ferromagnetic body so that the passageway thereof is in communication with the aperture of the ferromagnetic body; and
IV. a generally cylindrical housing having an opening defined at either end thereof and configured to receive and retain the electromagnet and holding assembly in an aligned relationship such that a portion of the stem of the actuator projects into the central passageway of the electromagnet and out of one of said openings defined in the housing, whereby said cable is immobilized upon activation of the electromagnet.

* * * * *

UNITED STATES PATENT AND TRADEMARK OFFICE
CERTIFICATE OF CORRECTION

PATENT NO. : 5,076,114
DATED : December 31, 1991
INVENTOR(S) : John W. Moody

It is certified that error appears in the above-identified patent and that said Letters Patent is hereby corrected as shown below:

On the title page, item [73]:
Assignee: Please delete "Pontiac Plans" and insert -- Drayton Plains --.

Column 5, Line 42, Please delete "20°" and insert -- 25° --.

Signed and Sealed this

Twenty-fifth Day of May, 1993

Attest:

MICHAEL K. KIRK

*Attesting Officer*    Acting Commissioner of Patents and Trademarks